Patented Oct. 22, 1940

2,219,167

UNITED STATES PATENT OFFICE 2,219,167

PROCESS FOR THE MANUFACTURE OF PREPARATIONS CONTAINING THE CIRCULATORY HORMONE CALLICREIN

Fritz Schultz, Wuppertal-Elberfeld, Germany, assignor to Winthrop Chemical Company, Inc., New York, N. Y., a corporation of New York No Drawing. Application April 26, 1938, Serial No. 204,314. In Germany May 14, 1937

10 Claims. (Cl. 167—74)

My present invention relates to a new and especially advantageous process for the preparation of the circulatory hormone callicrein.

It is known that for the manufacture of callicrein preparations pig's pancreas are autolyzed in the presence of acetic acid, the autolyzate is filtered, dialyzed, precipitated with acetone, the precipitate elutriated with sodium bicarbonate solution and again dialyzed. This process yields an amount of callicrein to a maximum of 18,000 units per kg. of pancreas. It works in 6 stages and therefore takes much time, especially because of the difficult separation of the autolyzate and the two dialyzing steps.

In accordance with my present invention I have found that preparations of the circulatory hormone callicrein can be obtained in a very simple manner with much better yield in a very short time. In carrying out my invention I use as starting material the pancreas glands of cattle and pigs which have proved particularly suitable. The glands are freed from fat and preferably previously ground through a meat grinder. Then an autolysis is effected in the presence of acids, compounds having an alkaline reaction, buffer salts, or disinfecting agents such as thymol. Particularly high yields are obtained by effecting the autolysis of the pancreas glands without adding electrolytes and solvents.

The autolyzate thus obtained is then treated with a solution of colloidal iron oxide and the solution separated from the residue of the autolysis and the precipitate caused by the iron oxide.

The treatment with a solution of colloidal iron oxide is the new and essential step of my present invention because this treatment makes it possible to perform complete separation of the liquid from the autolyzate in a remarkably short time which separation used to last several days and was inefficient.

The solution thus obtained can be dialyzed if desired in the usual way. The autolyzate before treating it with a solution of colloidal iron oxide may be diluted. By treating the autolyzate with colloidal dissolved iron oxide callicrein is not precipitated but remains quantitatively in solution. This fact is surprising since callicrein is almost quantitatively absorbed by iron oxide formed directly in the solution, for example, from iron chloride and ammonia, or by argillaceous earth made from alum and ammonia.

Before subjecting the autolyzate to the treatment with colloidal dissolved iron oxide a filtration may be performed in order to facilitate filtration, the autolyzate is preferably acidified to a pH of at most 4.0, preferably about 5.0. Electrolytes, for example sodium chloride, may be added, if desired.

By my present process callicrein is obtained in a yield which is 4 times larger than that obtained according to the known processes. The yield amounts up to 80,000 units per kg. pancreas. The state of purity is the same, but the time of working is decreased to about $\frac{1}{6}$. Instead of the 6 stages which were hitherto necessary the present process can be carried out in 3 stages.

The preparations thus obtained can be used for peroral as well as for parenteral administration. They can be further purified, for example, by adsorption on argillaceous earth.

The following examples illustrate the invention without, however, restricting it thereto.

Example 1

Pancreas which has been freed from fat is comminuted. From this pasty mass 5 kgs. are introduced in equal parts into 4 bottles each of 10 liters capacity. 3.75 liters of water and 4.5 kgs. of glacial acetic acid are poured into each bottle, whereupon the mixture is well stirred. The bottles, which are closed by pierced stoppers remain standing for 72 hours at 37° C.; the mixture is stirred several times every day. When the autolysis is finished the contents of the bottles are introduced into a vessel of 30 liters capacity, and 6 liters of a 10 percent colloidal iron oxide solution (ferrum oxydatum dialysatum in lamellis) are gradually added. A considerable precipitate is formed. The solution is stirred for one hour, whereupon it is filtered. The filtration is complete in a remarkably short time. The filtrate is neutralized with soda lye and dialyzed against running water for 72 hours in tubes of regenerated cellulose under toluene. The yield amounts to 300,000 units; one unit is bound to 50 $\nu$ of organic substance.

Example 2

Pancreas which has been freed from fat is minced. From this pasty mass 5 kgs. are introduced in equal parts into 2 bottles each of 10 liters capacity. The pasty mass is autolyzed in these bottles for 72 hours at 37° C. When the autolysis is complete the contents are poured into a vessel of 25 liters capacity and gradually mixed with 15 liters of distilled water while vigorously stirring. The solution is stirred for about an hour until the whole mass is well mixed. Then 4 liters of 10 per cent colloidal iron oxide solution are gradually added. The solution is filtered and dialyzed for 72 hours. The yield amounts to 350,000 units, one unit is bound to 110 γ of organic substance.

*Example 3*

Pancreas which has been freed from fat is comminuted. From this pasty mass 5 kgs. are introduced in equal parts into 4 bottles each of 10 liters capacity. 3.75 liters of water and 4.5 gs. of glacial acetic acid are poured into each bottle whereupon the mixture is well stirred. The bottles which are closed by pierced stoppers remain standing for 72 hours at 37° C.; the mixture is stirred several times every day. When the autolysis is finished the contents of the bottles are introduced into a vessel of 25 liters capacity and while vigorously stirring with hydrochloric acid acidified to a pH of 5.5.

The solution is filtered and 5 liters of a 10 per cent colloidal iron oxide solution are added while stirring the filtrate. A strong precipitate is formed whereby a pH of about 4.8 is reached. The solution is separated by filtering off the residue and dialyzed for 72 hours in tubes consisting of regenerated cellulose under toluene against running water. The yield amounts to 250,000 units, one unit is bound to 50 γ of organic substance.

*Example 4*

Pancreas which has been freed from fat is comminuted. From this pasty mass 5 kgs. are introduced in equal parts into 4 bottles each of 10 liters capacity. 3.75 liters of water saturated with thymol are poured into each bottle whereupon the mixture is well stirred. The bottles which are closed by pierced stoppers remain standing for 72 hours at 37° C.; the mixture is stirred several times every day. When the autolysis is finished the contents of the bottles are introduced into a vessel of 25 liters capacity and while vigorously stirring 5 liters of a 10 per cent colloidal iron oxide solution are added. A strong precipitate is formed. The solution is separated by filtering off the residue and dialyzed against running water for 72 hours in tubes of regenerated cellulose under toluene. The yield amounts to 350,000 units, one unit is bound to 90 γ of organic substance.

I claim:

1. The process of preparing preparations containing the circulatory hormone callicrein which consists in autolyzing pancreas glands of animals, treating the autolyzate with a solution of colloidal iron oxide, and separating the solution from the residue of the autolysis and the precipitate caused by the iron oxide solution.

2. The process of preparing preparations containing the circulatory hormone callicrein which consists in autolyzing pancreas glands of cattle and pigs treating the autolyzate with a solution of colloidal iron oxide, separating the solution from the residue of the autolysis and the precipitate caused by the iron oxide solution and dialyzing the solution.

3. The process of preparing preparations containing the circulatory hormone callicrein which consists in autolyzing pancreas glands of cattle and pigs in the presence of an acid reacting agent treating the autolyzate with a solution of colloidal iron oxide, separating the solution from the residue of the autolysis and the precipitate caused by the iron oxide solution, and dialyzing the solution.

4. The process of preparing preparations containing the circulatory hormone callicrein which consists in autolyzing pancreas glands of cattle and pigs for about 4 days in the presence of a saturated aqueous solution of thymol, treating the autolyzate with a solution of colloidal iron oxide, separating the solution from the residue of the autolysis and the precipitate caused by the iron oxide solution, and dialyzing the solution.

5. The process of preparing preparations containing the circulatory hormone callicrein which consists in autolyzing the pancreas glands of cattle and pigs, acidifying the autolyzate to a pH of at most 4.0, filtering the autolyzate, treating the filterate thus obtained with a solution of colloidal iron oxide, separating the solution from the residue of the autolysis and the precipitate caused by the iron oxide, and dialyzing the solution.

6. The process of preparing preparations containing the circulatory hormone callicrein which consists in autolyzing the pancreas glands of cattle and pigs, acidifying the autolyzate to a pH of at most 4.0, adding an electrolye, filtering the autolyzate, treating the filtrate thus obtained with a solution of colloidal iron oxide, separating the solution from the residue of the autolysis and the precipitate caused by the iron oxide, and dialyzing the solution.

7. The process of preparing preparations containing the circulatory hormone callicrein which consists in autolyzing the pancreas glands of cattle and pigs, acidifying the autolyzate to a pH of at most 4.0, adding sodium chloride, filtering the autolyzate, treating the filtrate thus obtained with a solution of colloidal iron oxide, separating the solution from the residue of the autolysis and the precipitate caused by the iron oxide, and dialyzing the solution.

8. The process of preparing preparations containing the circulatory hormone callicrein which consists in autolyzing pancreas glands of cattle and pigs for about 4 days in the presence of a saturated aqueous solution of thymol, acidifying the autolyzate to a pH of about 4.5, filtering the autolyzate, treating the filtrate thus obtained with a solution of colloidal iron oxide, separating the solution from the residue of the autolysis and the precipitate caused by the iron oxide, and dialyzing the solution.

9. The process of preparing preparations containing the circulatory hormone callicrein which consists in autolyzing pancreas glands of cattle and pigs in the presence of an alkaline acting agent, treating the autolyzate with a solution of colloidal iron oxide, separating the solution from the residue of the autolysis and the precipitate caused by the iron oxide solution, and dialyzing the solution.

10. The process of preparing preparations containing the circulatory hormone callicrein which consists in autolyzing pancreas glands of cattle and pigs in the presence of a disinfecting agent, treating the autolyzate with a solution of colloidal iron oxide, separating the solution from the residue of the altolysis and the precipitate caused by the iron oxide solution, and dialyzing the solution.

FRITZ SCHULTZ.